United States Patent [19]

Onizuka et al.

[11] Patent Number: 5,703,746
[45] Date of Patent: Dec. 30, 1997

[54] ELECTRIC JUNCTION BOX AND ELECTRIC CURRENT DISTRIBUTION SYSTEM

[75] Inventors: Takahiro Onizuka; Yuuji Saka, both of Yokkaichi, Japan

[73] Assignee: Sumitomo Wiring Systems, Ltd., Japan

[21] Appl. No.: 602,988

[22] Filed: Feb. 16, 1996

[30] Foreign Application Priority Data

Feb. 23, 1995 [JP] Japan .................................. 7-035082

[51] Int. Cl.$^6$ .................................................. H02H 5/04
[52] U.S. Cl. .................................. 361/106; 361/45; 361/57
[58] Field of Search .............................. 361/23–24, 27, 361/31, 42, 45–46, 49–50, 57–58, 62–63, 87, 103, 106; 307/39

[56] References Cited

U.S. PATENT DOCUMENTS

| 4,344,100 | 8/1982 | Davidson et al. ................ 361/45 |
| 4,977,477 | 12/1990 | Babico et al. ................ 361/98 |

FOREIGN PATENT DOCUMENTS 6-255432  9/1994  Japan .

*Primary Examiner*—Jeffrey A. Gaffin
*Assistant Examiner*—Michael J. Sherry
*Attorney, Agent, or Firm*—Jordan B. Bierman; Bierman, Muserlian and Lucas LLP

[57] ABSTRACT

Wiring harnessess are current feedback paths from the loads to a battery, thereby forming a closed-circuit. For each load, there are provided a current detector and a current control; each current detector compares the current input to a junction box to the output current from the corresponding load via a corresponding wiring harness, and outputs a normal state signal when the two currents are equal. When the input and output currents are at variance with each other, it outputs an abnormal state signal. Each current controller causes, upon receipt of the normal state signal, the input current to flow into the corresponding load along normal current path; upon receipt of the abnormal state signal, the input current is directed to flow to a current cutoff which includes a thermal device which is disposed in parallel with the current path and whose resistance value changes with temperature, thereby cutting off the flow of current to the load. Since the flow of current into each load can be cut off based on variation of the resistance value of the thermal device, the need for replacement of fuses, is thereby obviated and maintenance is simplified.

20 Claims, 3 Drawing Sheets

ELECTRIC JUNCTION BOX AND ELECTRIC CURRENT DISTRIBUTION SYSTEM
===

This Application claims the priority of Japanese Application 7/35082, filed Feb. 23, 1995.

The present Invention relates to a junction box for use in a system for distributing electric current to a plurality of loads. It is particularly useful in automotive vehicles wherein it distributes the electric current from e.g. an alternator or a battery to respective loads via junction box housing relays.

BACKGROUND OF THE INVENTION

The prior art distribution systems for automotive vehicles are constructed, for example, as shown in FIG. 3. Specifically, one end of first fusible link 2 is connected to alternator 1, and one end of second fusible link 4 is connected to the positive terminal of battery 3, the negative terminal being grounded. The other ends of fusible links 2 and 4 are connected to the input terminal of junction box 5 installed in the engine compartment. One end of each load 7 (only one is shown), such as a lamp system, a motor system, and an ignition system, is connected to the corresponding output terminal of junction box 5 via switch 6. The other end of load 7 is grounded.

Junction box 5 houses a plurality of series circuits disposed between the input terminal and corresponding output terminals. Each series circuit consists essentially of fuse FS and relay RL. For example, when switch 6 is on, relay RL supplies electric current to corresponding load 7.

When the engine starts after the ignition switch is turned on, current from battery 3 flows into junction box 5. After the start of the engine, current obtained by rectifying alternating current generated in alternator 1 flows into the battery 3 and load 7 via junction box 5. On the other hand, when there is a short-circuit in load 7, the excessive current resulting therefrom burns out fuse FS, thereby cutting off the flow of current thereto. However, in the prior art electric current distribution system, once fuse FS is burned out, the system cannot be restored unless the fuse is replaced. This makes maintenance very inconvenient.

SUMMARY OF THE INVENTION

Accordingly, it is an object of the present Invention to provide a junction box for use in an electric current distribution system and a distribution system for use therewith, which allows for simplified maintenance, in particular by obviating the need for replacement of fuses.

The Invention will be described with particular reference to electrical systems for automotive vehicles, but the use is by no means limited thereto. In fact, the Invention is applicable to any electrical system, especially those having a plurality of loads, wherein a danger of short circuiting or overloading exists.

The electric junction box according to the Invention comprises a current detector provided for an external load and adapted to compare the input current to the junction box with the output current from the load. The detection outputs a normal state signal when the input current and the output current are substantially equal to each other and outputs an abnormal state signal when the input current and the output current are at variance with each other. Preferably, the current detector comprises a differential amplifier.

The box also contains a current control for the load which, upon receipt of the normal state signal, causes the input current to flow along a current path leading to the load; upon receipt of the abnormal state signal, it causes the input current to flow into a current cutoff, thereby stopping the flow of current to the load. In a preferred embodiment of the Invention, the current cutoff is in parallel with the current path.

It is also desirable that the current cutoff include a thermal device whose resistance value varies with temperature. The device advantageously comprises a posistor and/or a thermistor.

According to the Invention, there is further provided an electric current distribution system, comprising at least one electric junction box according to the Invention, in which first and second fusible links are connected to an alternator and a battery, respectively. An input terminal of the junction box is connected to the first and second fusible links and the output terminals thereof are connected to a corresponding number of loads. According to a preferred embodiment, the distribution system further comprises a wiring harness which forms a current feedback path from each of the loads to the battery.

According to another desirable embodiment, the current detector further comprises a current change detector which can detect a change in current due e.g. to a malfunction of the load resulting from external influence and is adapted to signal the current control to direct the current flow into the current cutoff. In such a case, the change detector outputs an abnormal state signal, thus indicating that there is a malfunction of the load or other components.

In an especially useful embodiment, the change detector compares the input current with a predetermined maximum and outputs an abnormal state signal when the input current is equal to or higher than the predetermined maximum. This indicates a malfunction of the load by an error lamp on the control panel or causes the current to flow to the current cutoff. The comparison of the input current with the maximum is advantageously carried out a predetermined time after the load has been switched on. This ensures that start-up current (i.e. a high initial current), which drops after a given time, does not cause the abnormal state signal to be erroneously emitted.

Another useful modification is one in which the current change detector compares the actual input current with a previous input current and outputs the abnormal state signal when the actual input current is substantially higher than the previous input current. Thus, by storing a previous input current in the memory and comparing it with the actual current input, malfunction of a component (e.g. a load) is detected and signaled by emitting the abnormal state signal.

In a further preferred embodiment, there is provided an electric current distribution system for automotive vehicles in which the first and second fusible links are connected to an alternator and a battery, respectively, and the input terminal of the junction box is connected to the first and second fusible links and is provided with a plurality of output terminals which, in turn, are connected to various loads. Wiring harnesses are provided which form a current feedback path from each of the loads to the battery and to a current detector in the junction box. The current detector (one for each load) compares the current input to the junction box to the output current from the corresponding load (via the corresponding wiring harness). It outputs a normal state signal when the input and output currents are equal, and outputs an abnormal state signal when the input current and the output current are at variance with each other. The current control (one provided for each of the loads) is adapted to cause, upon receipt of the normal state signal, the input current to flow along the current path leading to the corresponding load. Upon receipt of the abnormal state signal, it causes the input current to flow into the current cutoff, which is in parallel with the current path. The cutoff contains a thermal device, the resistance of which varies with temperature, which serves to stop the flow of current to the particular load.

A current detector is provided for each load. It outputs the normal state signal when the input and output currents are equal and outputs the abnormal state signal when the input and output currents are at variance with each other. Each current control, upon receipt of the normal state signal, causes the current to flow into the corresponding load along the current path; upon receipt of the abnormal state signal, it directs the current to the cutoff, thereby stopping the flow of current to the load. The current cutoff may be provided with a thermal device having a resistance which varies with temperature; thus, upon a short-circuit or similar abnormality occurring in the load (which would generate heat), the flow of current into the load can be cut off. This obviates the need for replacement of fuses as in the prior art, thereby providing a junction box which can be easily maintained and is more convenient for the motorist.

BRIEF DESCRIPTION OF THE DRAWINGS

In the accompanying drawings, constituting a part hereof, and in which like reference characters indicate like parts.

Figure 1:
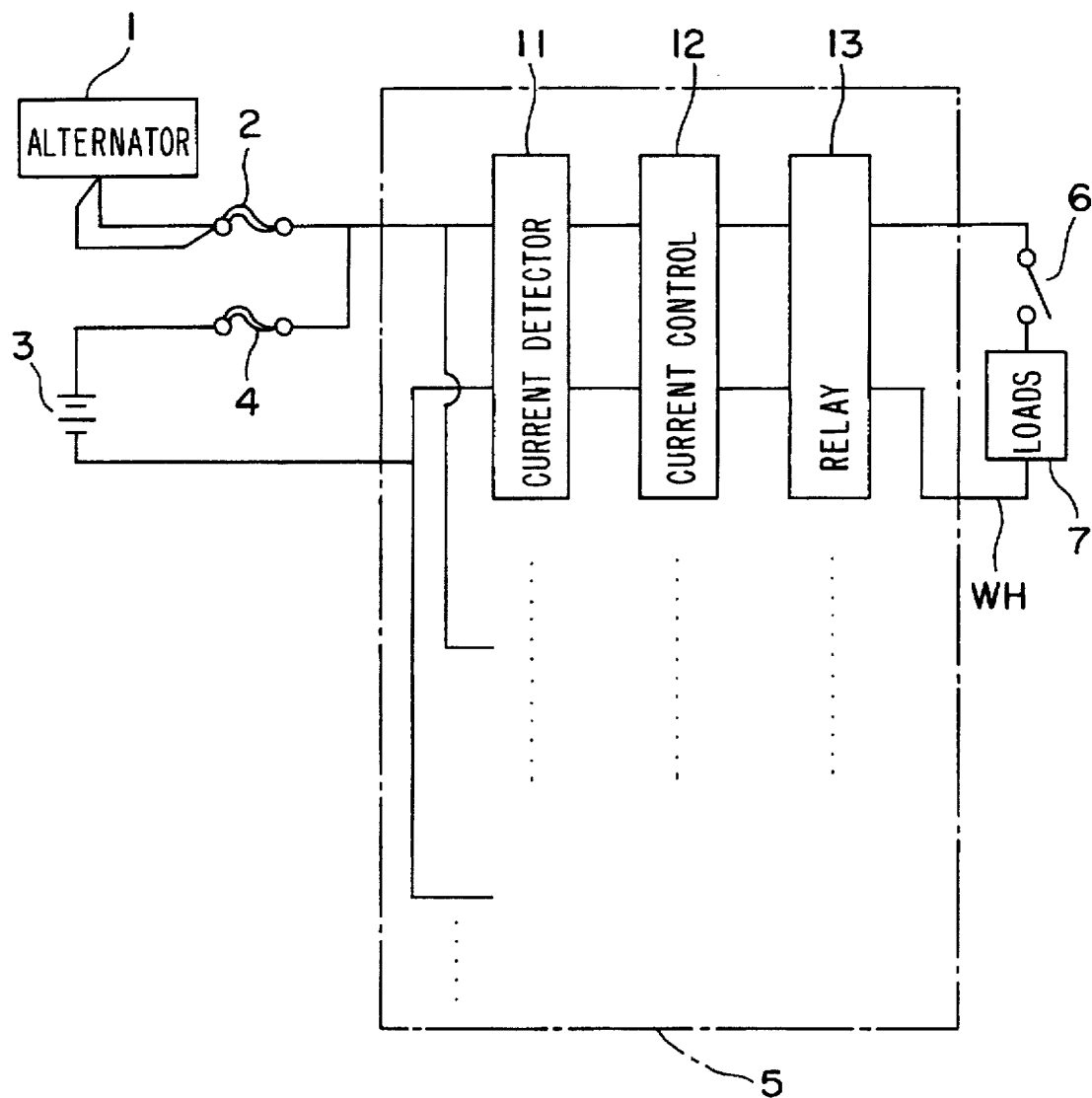
FIG. 1 is a schematic block diagram of one embodiment of the Invention.

The present Invention (FIGS. 1 and 2) differs from the prior art (FIG. 3) in that, instead of grounding loads 7 and the negative terminal of battery 3, wiring harnesses WH are provided which form current feedback paths from loads 7 to battery 3 and current detector 11, thereby forming a closed-circuit.

Further, instead of the circuits each consisting of fuse FS and relay RL, there are provided in series current detector 11, current control 12, and relay 13 for each load 7. Each current detector 11 compares the input current to junction box 5 to the output current from a load 7 via its corresponding wiring harness WH, and outputs the normal state signal when the output and input currents and equal, and outputs the abnormal state signal when the output and input currents are at variance. Each current control 12 causes, upon receipt of the normal state signal, the input current to flow along the current path leading to a load 7. Upon receipt of the abnormal state signal, it causes the input current to flow into the current cutoff device, including a posistor, disposed in parallel with the current path, thereby cutting off the flow of current to the load. The posistor is a thermal device having a resistance which varies with temperature. The relay 13 includes a relay for supplying the current from current control 12 to corresponding load 7 and a transistor or similar device for controlling the relay.

Figure 2:
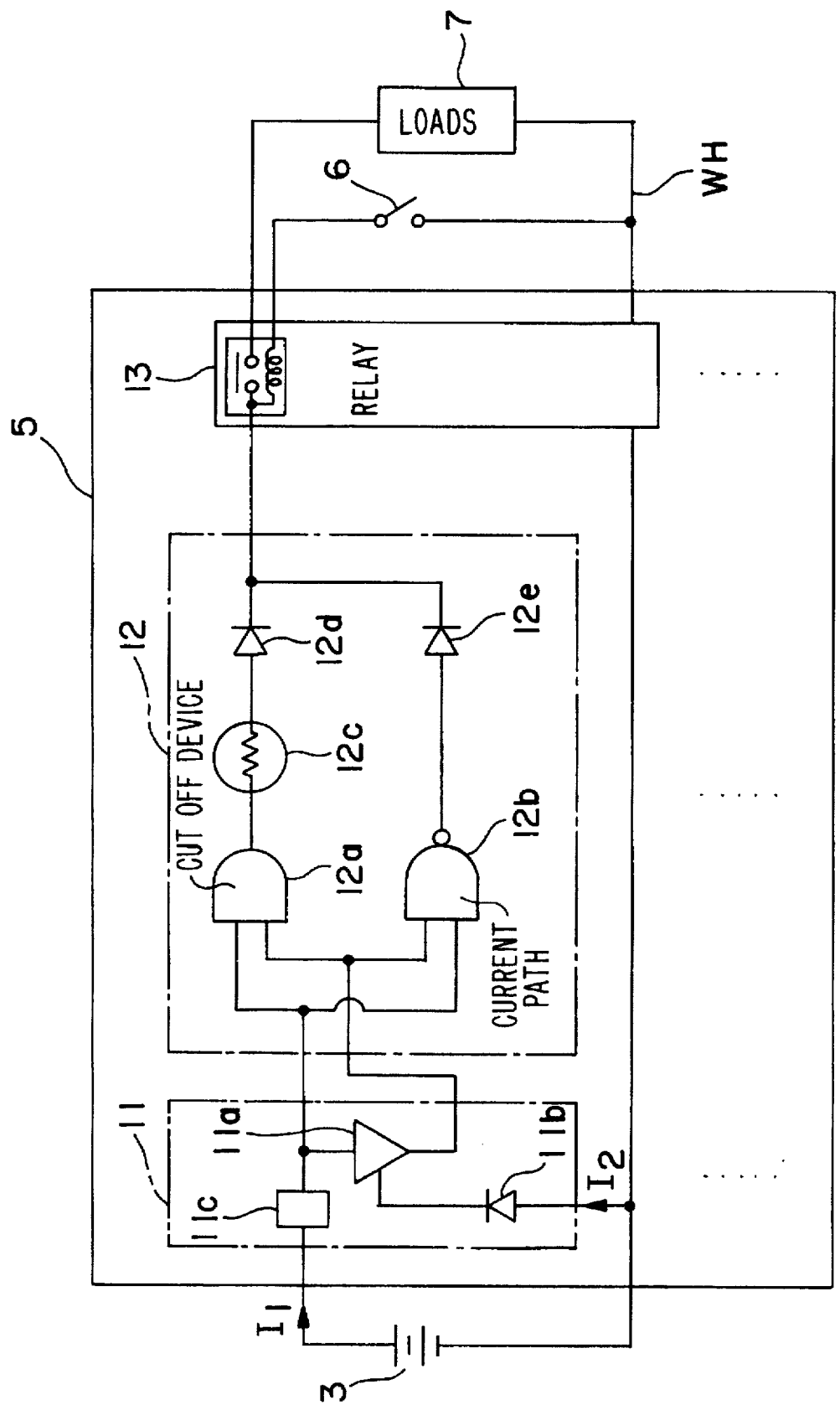
FIG. 2 is a more detailed block diagram of the embodiment.
Figure 3:
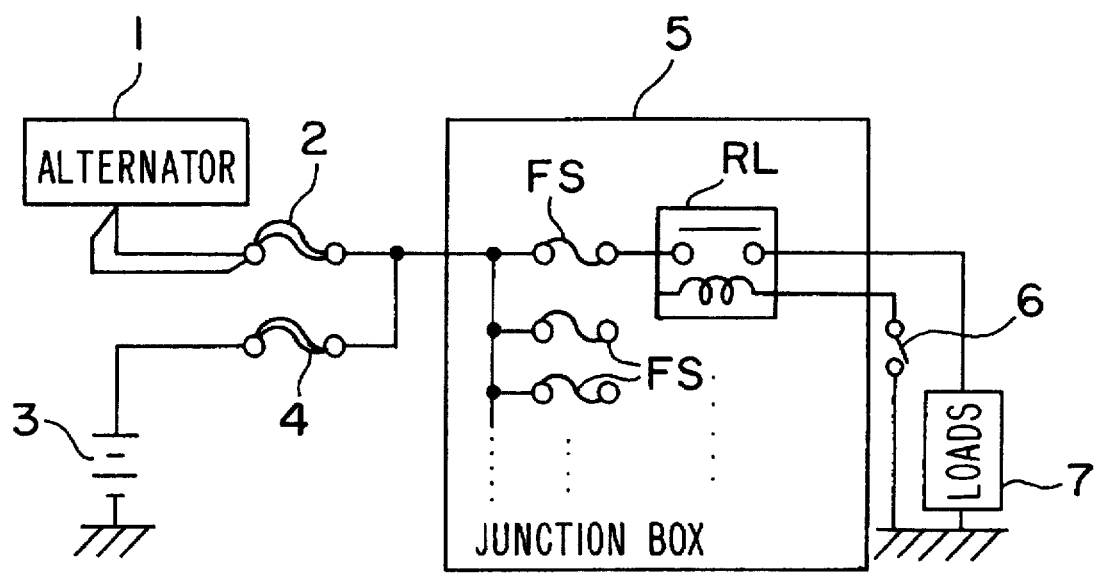
FIG. 3 is a diagram of a prior art electric current distribution system.

FIG. 2 shows current detector 11, current control 12 and relay 13 for one load 7. Although no description of the configuration of the other loads is given, they are similar to the one shown. Current detector 11 includes differential amplifier 11a and reverse-blocking diode 11b. One input terminal of differential amplifier 11a is connected to the input terminal of junction box 5, whereas the other input terminal thereof is connected to wiring harness WH via diode 11b. Current detector 11 outputs a low-level (hereinafter L) signal as a normal state signal when input current I1 is equal to output current I2. It outputs a high-level (hereinafter H) signal as an abnormal state signal when input current I1 is at variance with output current I2.

Further, current control 12 includes AND gate 12a, NAND gate 12b, posistor 12c as the thermal device, and reverse-blocking diodes 12d and 12e. One input terminal of each of gates 12a and 12b is connected to the input terminal of junction box 5, and the other input terminal thereof is connected to the output terminal of differential amplifier 11a. The output terminal of AND gate 12a is connected to relay 13 via posistor 12c and the anode and cathode of diode 12d. The output terminal of NAND gate 12b is connected to relay 13 via the anode and the cathode of diode 12e.

When differential amplifier 11a delivers an L-output corresponding to the normal state signal, AND gate 12a and NAND gate 12b deliver an L-output and an H-output, respectively, so that current is supplied to load 7 via diode 12e and relay 13. If short-circuiting occurs in load 7, input current I1 and output current I2 will differ from each other (I1<I2 or I1>I2). Accordingly, differential amplifier 11a delivers an H-output corresponding to the abnormal state signal as described above. Then, AND gate 12a and NAND gate 12b deliver an H-output and an L-output, respectively, so that current is supplied to load 7 via posistor 12c and the anode and the cathode of diode 12d and relay 13. Accordingly, even if short-circuiting occurs in any of loads 7, replacement of fuses as in the prior art is not necessary, thereby simplifying maintenance.

The foregoing embodiment is described with respect to the case where a posistor is used as a thermal device. However, it should be appreciated that a thermistor may be used to cut off the current to load 7 based on its resistance/temperature.

In particular, in this form of the Invention, current change detector 11c compares input current I1 with a predetermined maximum and outputs an abnormal state signal H when input current I1 is equal to or higher than the maximum. The abnormal state signal H indicates a malfunction of load 7 by a device such as an error lamp on the control panel, or it can cause the current to flow to current cutoff 12a, 12c, 12d. The comparison of input current I1 with the predetermined maximum threshold may be delayed for a predetermined time period after switching on load 7. This ensures that an initial high current drain which reduces after a given time (e.g. a surge caused by the electromagnetic charging of an inductance) does not cause the abnormal state signal H to be emitted.

Furthermore, current change detector 11c can compare actual input current I1 with a previous input current, and output an abnormal state signal H when actual input current I1 is substantially higher than the previous input current. Thus, by storing the previous input current in the memory and comparing actual current input I1 with the previous input current, malfunction of a component e.g. load 7 is detected and indicated by emission of the abnormal state signal H to a signal lamp or by directing the current to flow into the current cutoff.

While only a specific number of embodiments of the present Invention have been expressly disclosed, it is, nonetheless, to be broadly construed and not to be limited except by the character of the claims appended hereto.

What we claim is:

1. A junction box for use in connection with an electric current distribution system comprising a current detector having a detector input and a detector output, a current control having a control input and a control output, said detector input adapted for electrical connection to a source of electric current and a load output from a load, said detector output electrically connected to said control input, said control output adapted to be electrically connected to a load input to said load, said current detector adapted to compare an input current from said source with an output current from said load, said current detector outputting, through said detector output, a normal state signal when said input current and said output current are substantially equal, said current detector outputting, through said detector output, an abnormal state signal when said input current and said output current are not substantially equal, said control adapted to receive said normal signal and said abnormal signal through said control input, when said normal signal is received, said control directs said input current along a normal current path to said load input, when said abnormal signal is received, said control directs said input current to a current cutoff adapted to prevent said input current from reaching said load, said cutoff comprising a cutoff device whose electrical resistance varies with temperature.

2. The junction box of claim 1 wherein said current cutoff is in parallel with said normal current path.

3. The junction box of claim 1 wherein said cutoff device is a posistor and/or a thermistor.

4. The junction box of claim 1 wherein said current detector comprises a differential amplifier.

5. The junction box of claim 4 wherein said differential amplifier has a first input, a second input, and a differential output, said first input electrically connected to said detector input, said second input electrically connected to said load output, said differential output electrically connected to said control input.

6. The junction box of claim 1 wherein said control comprises an AND gate and an NAND gate.

7. The junction box of claim 1 wherein said control outputs a low-level signal when said input current and said output current are substantially equal, and said control emits a high-level signal when said input current and said output current are not substantially equal.

8. The junction box of claim 1 wherein there is a relay between said current control and said load.

9. The junction box of claim 1 wherein there are a plurality of said loads, a plurality of said controls, and a plurality of said current detectors.

10. An electric current distribution system comprising at least one junction box according to claim 1, said source being a battery and an alternator, said detector input electrically connected to said source and to said load output, said control output electrically connected to said load input.

11. The system of claim 10 wherein there is a first fusible link electrically connected to said alternator and said detector input, and a second fusible link electrically connected to said battery and said detector input.

12. The system of claim 10 wherein said load output is a wiring harness electrically connected to said battery, thereby forming a feedback path from said load to said battery.

13. The system of claim 11 wherein said load output is a wiring harness electrically connected to said battery, thereby forming a feedback path from said load to said battery.

14. The system of claim 12 wherein said current detector comprises a change detector for detecting a change in said input current and comparing said input current with a predetermined maximum.

15. The system of claim 14 wherein said change detector outputs said abnormal signal when said input current is not less than said maximum.

16. The system of claim 12 wherein said current detector comprises a differential amplifier which compares said input current and said output current.

17. The system of claim 16 wherein said amplifier outputs said abnormal signal when said input current and said output current are not substantially equal.

18. The system of claim 14 wherein said predetermined maximum is a previous input current and said change detector outputs said abnormal signal when said input current is substantially higher than said previous current.

19. The system of claim 10 wherein said current detector comprises a differential amplifier which compares said input current and said output current, said amplifier having a first input, electrically connected to said detector input, a second input, electrically connected to said load output, and an amplifier output electrically connected to an AND gate and a NAND gate, when said normal signal is received, said AND gate outputs a low-level signal and said NAND gate outputs a high-level signal, when said abnormal signal is received, said AND gate emits a high-level signal and said NAND gate emits a low-level signal.

20. The system of claim 19 wherein, when said input current and said output current are substantially different from each other, said amplifier outputs said abnormal signal.

* * * * *